Aug. 28, 1923.
F. HOLTON
WEED EXTRACTOR
1,466,168
Filed July 29, 1921
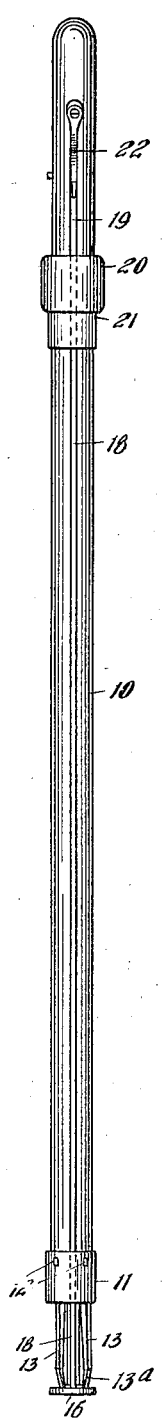
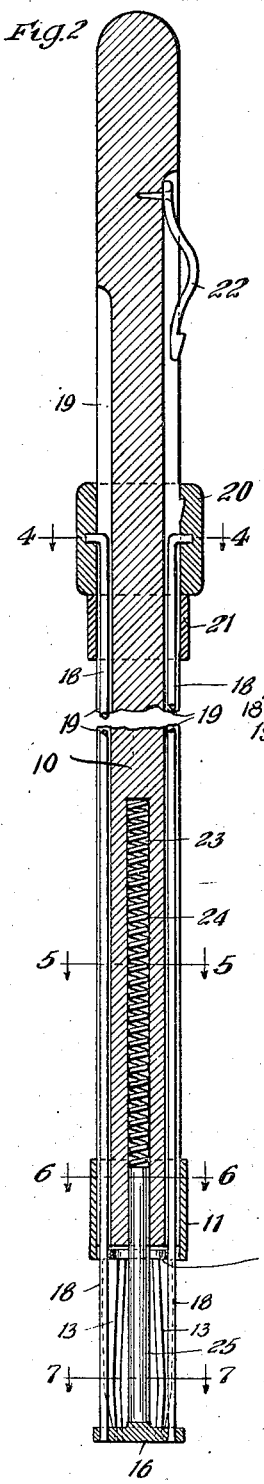
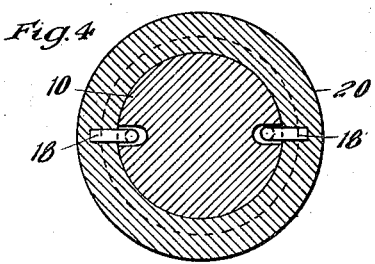
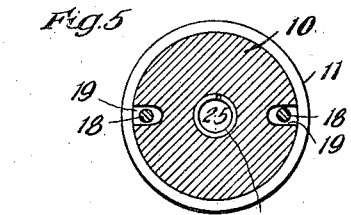
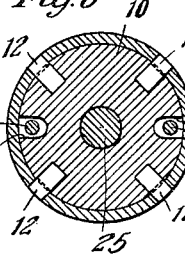
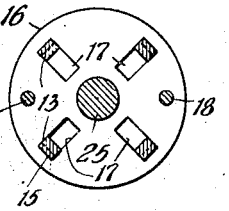
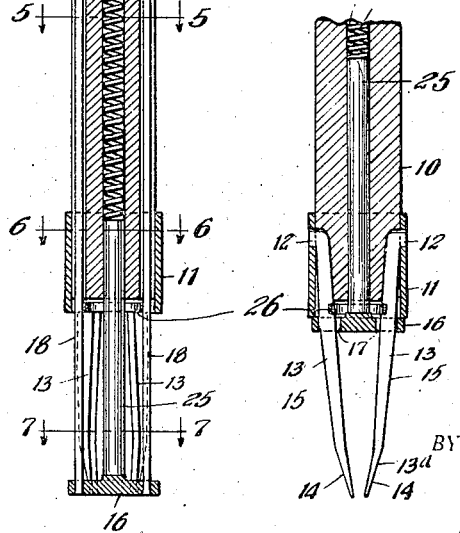
INVENTOR.
Frank Holton
BY Geo. J. Haight
His ATTORNEY.

Patented Aug. 28, 1923.

1,466,168

UNITED STATES PATENT OFFICE.

FRANK HOLTON, OF CHICAGO, ILLINOIS.

WEED EXTRACTOR.

Application filed July 29, 1921. Serial No. 488,295.

*To all whom it may concern:*

Be it known that I, FRANK HOLTON, a citizen of the United States, residing at Chicago, in the county of Cook and State of Illinois, have invented a certain new and useful Improvement in Weed Extractors, of which the following is a full, clear, concise, and exact description, reference being had to the accompanying drawings, forming a part of this specification.

This invention relates to improvements in weed extractors.

One object of the invention is to provide a relatively inexpensive, simple and efficient device for extracting and removing dandelions, weeds and the like from lawns or other places.

More specifically the object of my invention is to provide a weed extractor of the character indicated which is so arranged that it may be placed on top of the weed to be extracted and then by simply depressing the part held by the operator, certain gripping fingers or prongs will be forced down alongside the root of the weed and ultimately cammed inwardly so as to firmly grip the root and there automatically locked whereby, upon pulling upwardly on the device, the weed with its roots will be withdrawn from the ground.

Other objects of the invention will more clearly appear from the description and claims hereinafter appearing.

In the drawing forming a part of this specification, Figure 1 is a side elevation of an extractor embodying my improvements. Fig. 2 is an enlarged partial longitudinal sectional view of the structure shown in Fig. 1 to more clearly illustrate certain details of construction. Fig. 3 is a view similar to Fig. 2 of the lower portion of the extractor but showing the position assumed by the parts when the extractor has been depressed to grip the root of the weed. Figs. 4, 5, 6 and 7 are cross sectional views taken respectively on the line 4—4, 5—5, 6—6 and 7—7 of Fig. 2.

In said drawing, the main support or member upon which the other parts are mounted is indicated at 10 and preferably consists of a cylindrical elongated wooden stock or handle of sufficient length so that the user may stand approximately upright when removing the weeds from the ground. At the lower end of the main supporting member 10 is applied a relatively heavy ferrule 11 provided on the inner side thereof with a series of radially extended openings 12—12 in which are pivoted the upper ends of a plurality, in this instance four, of gripping fingers or prongs 13.

The four fingers or prongs 13 are seated in slots in the support 10, as clearly shown in Figs. 3 and 6 and extend for their major portion below the main support 10. At their extreme lower ends the fingers 13 are turned or bent inwardly as indicated at 13ª and are sharpened as clearly indicated in Figs. 2 and 3. The outer edges of said fingers 13 are beveled or inclined as indicated at 14 and 15 so as to provide cam edges which cooperate with a cam plate or disc 16. The latter is of circular form as shown in Fig. 7 and is provided with four uniformly spaced radially extending rectangular openings 17—17 through which the fingers 13 slide. The cam disc 16 has secured thereto two diametrically disposed wires or rods 18—18 which extend through the ferrule 11 and lengthwise of the main support or stock 10 within longitudinal grooves 19 as best shown in Fig. 2. As the rods 18 are confined within the grooves 19 and are rigidly secured to the cam disc 16 they effectively prevent relative rotation of the latter with reference to the support 10. At their upper ends, said rods 18 are secured to an annular knob or hand grip 20 which is slidable back and forth on the support 10. Said hand grip 20 is limited in its downward movement as shown in Fig. 2 by a suitable stop or shoulder 21 formed on the main support 10. In its upward movement relatively to the main support 10, the hand grip 20 is adapted to be automatically latched or locked under a spring latch 22. By depressing the bowed spring latch 22, the hand grip 20 can be released as will be understood.

At its lower end, the main support 10 has an axially extending socket or recess 23 within which is disposed a spring 24 bearing against the upper end of a slidable plunger 25, the lower end of said plunger 24 bearing on the disc 16.

The fingers 13 are normally held spread apart or in spaced relation by any suitable means such as the expansion coil spring 26 which is held in suitable notches formed in said fingers 13 closely adjacent the lower end of the main support 10.

The extractor is used in the following manner: Assuming the parts in the position best shown by Fig. 2, the user places the extractor on top of the dandelion or other weed to be removed, the cam disc 16 resting thereupon. The user then depresses the main support 10 which causes the fingers 13 to be forced downwardly through the cam disc 16. As this action continues, the fingers 13 initially are moved substantially parallel to the movement of the main support or stock 10, but as the fingers 13 gradually pass through the cam disc 16, the outer edges 15 slide along the outer edges of the slot 17, thus gradually forcing the lower free ends of the fingers 13 inwardly toward each other until the position is assumed as shown in Fig. 3. At this point in the operation, the annular hand grip 20 automatically catches beneath the spring latch 22, thus holding the parts in place. The user then pulls up on the extractor bringing the weed with its root therewith. After the weed has been removed from the ground the operator merely depresses the latch 22 which releases the hand grip 20 and the latter, the connecting rods 18 and cam disc 16 are projected downwardly under the expansion of the spring 24 when the device is ready for the next operation.

The device is comparatively inexpensive to manufacture, can be operated with a minimum of effort and with the user in a normal, convenient standing position, thus minimizing fatigue. The arrangement which I have shown is one which I consider preferable but I am aware that various changes and modifications may be made without departing from the spirit of the invention and all such changes and modifications are contemplated as come within the scope of the claims appended hereto.

I claim:

1. In a device of the character described the combination with a main support; of a plurality of movably mounted gripping fingers attached at the lower end of said support; a cam element slidably mounted with respect to said support at said lower end and co-operable with said fingers to actuate the latter toward each other upon movement of the cam element toward the support; means for preventing relative rotation of said cam and support; and means independent of said first named means for guiding the sliding movement of said cam.

2. In a device of the character described the combination with a main support; of a plurality of gripping fingers pivotally attached at their upper ends to the lower end of said support; and a cam element slidable lengthwise of said fingers and cooperable therewith to actuate the free ends thereof inwardly toward each other upon movement of said cam element lengthwise of said fingers toward the support; and means for locking said cam in retracted position, comprising a co-acting pair of elements, one of said elements being slidably mounted on said support and connected to the cam to move in unison therewith.

3. In a device of the character described, the combination with a main support; of a plurality of gripping fingers pivotally attached at their upper ends to the lower end of said support; a cam element slidable lengthwise of said fingers and cooperable therewith to actuate the free ends thereof inwardly toward each other upon movement of said cam element lengthwise of said fingers toward the support; and spring means normally tending to maintain the free ends of said pivoted fingers in spaced apart relation.

4. In a device of the character described, the combination with a main support; of a plurality of movably mounted gripping fingers attached at the lower end of said support; a cam element slidably mounted with respect to said support at said lower end and cooperable with said fingers to actuate the latter toward each other upon movement of the cam element toward the support; a stem fixed to said cam element and guided within said support a hand grip slidably mounted on said support near the upper end thereof; and connections between said hand grip and said cam element.

5. In a device of the character described, the combination with a main support; of a plurality of gripping fingers pivotally attached at their upper ends to the lower end of said support; a cam element slidable lengthwise of said fingers and co-operable therewith to actuate the free ends thereof inwardly toward each other upon movement of said cam element lengthwise of said fingers toward the support; a guiding plunger fixed to said cam; means, including a spring, normally tending to force said cam element toward the free ends of said fingers; and means independent of said plunger for preventing relative rotary movement of said support and said cam.

6. In a device of the character described, the combination with a main support; of a plurality of gripping fingers pivotally attached at their upper ends to the lower end of said support; spring means cooperable with said fingers normally tending to maintain the free ends thereof in spaced apart relation; a cam element cooperable with said fingers and slidable lengthwise thereof, said cam element, upon movement toward the support, forcing the free ends of said fingers inwardly toward each other; and means, including a spring, normally tending to force said cam element toward the free ends of said fingers.

7. In a device of the character described, the combination with a main support; of a plurality of movably mounted gripping fingers attached at the lower end of said support; a cam element slidably mounted with respect to said support at said lower end and cooperable with said fingers to actuate the latter toward each other upon movement of the cam element toward the support; a hand grip slidably mounted on said support near the upper end thereof; connections between said hand grip and said cam element; and means for automatically latching said hand grip in its uppermost position relative to the main support.

8. In a device of the character described, the combinatioin with a main supporting member of elongated form; of a plurality of gripping fingers arranged in a circular series and pivotally attached at the upper ends to the lower end of said support; a cam element slidable lengthwise of said fingers toward and from the lower end of said support; spring means normally tending to maintain the free ends of said fingers in spaced relation; means normally tending to maintain said cam element at the free ends of said fingers; and means for locking said cam element in its position nearest the pivoted ends of said fingers.

9. In a device of the character described, the combination with an elongated main support; of a plurality of gripping fingers pivotally attached at their upper ends to the lower end of said support; a cam plate having slots therein through which said fingers extend, the outer edges of said fingers serving as cam edges cooperable with said plate upon movement of the latter toward the pivoted ends of said fingers; means, including a spring, normally tending to hold said cam plate near the free ends of said fingers; and means for automatically locking said cam plate in its position nearest the pivoted ends of said fingers.

In witness that I claim the foregoing I have hereunto subscribed my name this 13th day of July, 1921.

FRANK HOLTON.

Witnesses:
CARRIE GAILING.
ANN BAKER.